Figure 1:
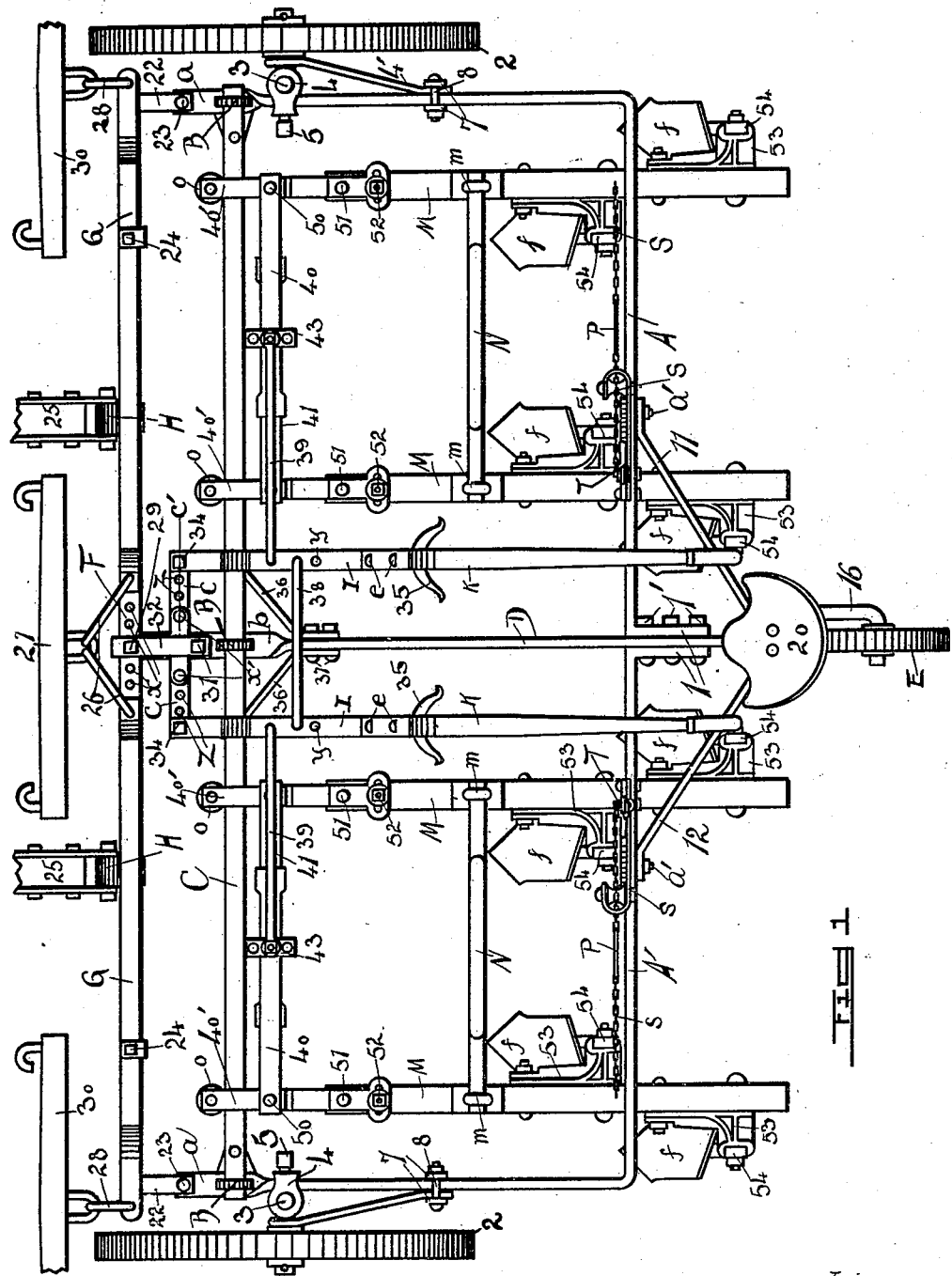

No. 710,183. Patented Sept. 30, 1902.
J. CLAUSEN.
TWO ROW CULTIVATOR.
(Application filed Sept. 13, 1901.)

(No Model.) 3 Sheets—Sheet 1.

WITNESSES:
R. J. Davenport
M. Bockhoff

INVENTOR
Jacob Clausen
PER Geo. W. Sule
ATTORNEY.

No. 710,183. Patented Sept. 30, 1902.
J. CLAUSEN.
TWO ROW CULTIVATOR.
(Application filed Sept. 13, 1901.)
(No Model.) 3 Sheets—Sheet 2.
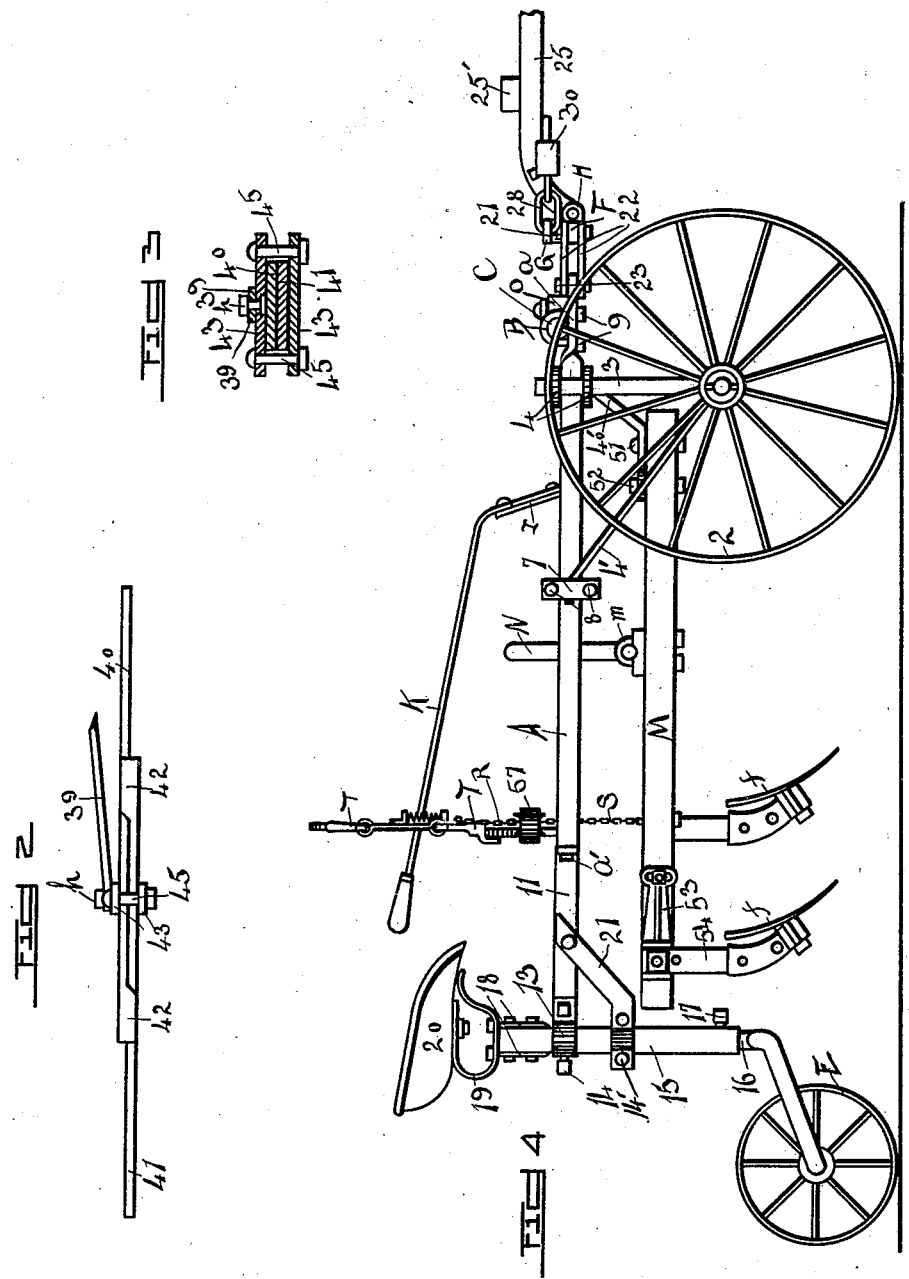
WITNESSES: INVENTOR
R.J. Davenport Jacob Clausen
M. Bockhoff PER Geo. W. Sues
ATTORNEY.

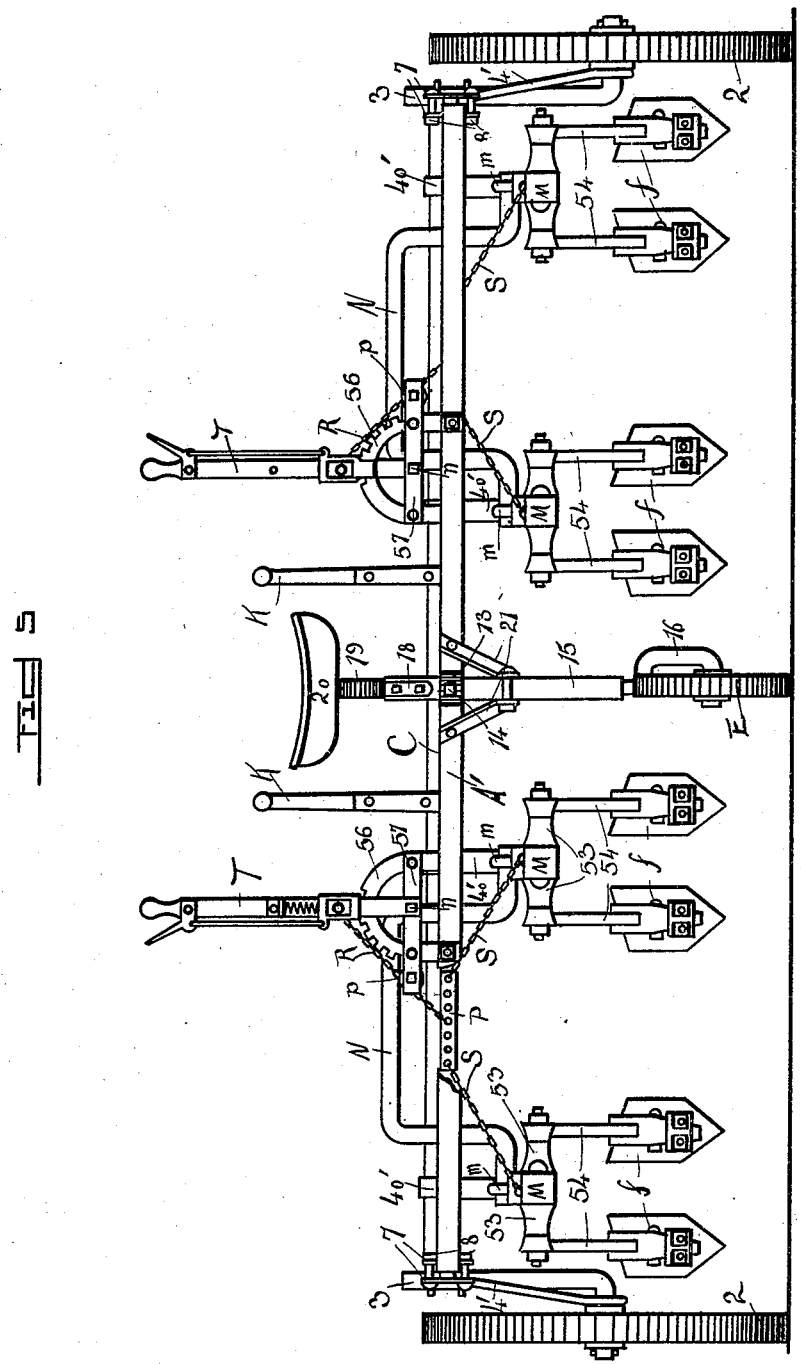

UNITED STATES PATENT OFFICE.

JACOB CLAUSEN, OF COUNCIL BLUFFS, IOWA.

TWO-ROW CULTIVATOR.

SPECIFICATION forming part of Letters Patent No. 710,183, dated September 30, 1902.

Application filed September 13, 1901. Serial No. 75,328. (No model.)

*To all whom it may concern:*

Be it known that I, JACOB CLAUSEN, residing at Council Bluffs, in the county of Pottawattamie and State of Iowa, have invented certain useful Improvements in Two-Row Cultivators; and I do hereby declare that the following is a full, clear, and exact description of the invention, such as will enable others skilled in the art to which it appertains to make and use the same, reference being had to the accompanying drawings, which form a part of this specification.

This invention relates to a new and novel two-row cultivator.

The object of my invention is to provide a two-row cultivator so arranged that the shares may be adjusted from side to side, may be raised and lowered, and embodying certain other combinations, as will be described more fully hereinafter.

In the accompanying drawings I have shown in Figure 1 a top view of a two-row cultivator embodying my invention with parts removed. Fig. 2 shows a detail disclosing the mechanism for regulating the spread of the cultivator-frames. Fig. 3 shows a central sectional view of Fig. 2. Fig. 4 shows a side elevation, with portions removed, of a two-row cultivator embodying my invention, while Fig. 5 shows a rear view of the cultivator embodying my invention.

My machine embodies, essentially, a central flat bar D, which has its forward end *b* bent at right angles, as is shown in Fig. 1. Secured to this bar D at the flat portion *b* is a sheave-guiding bar C, preferably in the form of an iron tube. This sheave-guiding bar C is fixed to the bar D by means of the U-shaped bolt B, provided with suitable nuts 9, as is disclosed in Fig. 4. By this means the sheave-guiding bar C is adjustably secured to the central bar D, as the nuts 9 can at any time be removed to permit a lateral adjustment of this sheave-bar C.

Secured to the main bar D by means of the angular ends 11 are the counterpart L-shaped frame members A and A', secured by means of suitable bolts and nuts 1', as disclosed in Fig. 1. These L-shaped frame members A and A' are also preferably flat, and their forward ends are turned at right angles to provide a flat surface, through which are passed the U-shaped bolts B, held by the nuts 9.

Adjustably secured to the side portion of the counterpart frame members A and A' are the sockets 4. Centrally these sockets 4 are provided with the set-screws 5, as is shown in Fig. 1, while the end portions thereof are perforated to receive the axle-stems 3, as is shown more clearly in Fig. 4, so that the frame members A and A' are pinched and bound against the axle-stems 3 by means of the set-screws 5, so that these wheel-supporting axle-stems may be slid backward or forward upon the frame members and can be almost instantly dissembled in packing or shipping the implement. Extending from the lower portion of these axle-stems 3 are the brace-bars 4', which brace-bars are secured to the frame members A A' by means of the clamp 7, held by suitable nut-provided bolts 8, as is disclosed in Figs. 1 and 4, so that these brace-bars may also be readily removed from the frame.

The axle-stems 3 are provided with the wheels 2 2, so that the frame is supported in front by these wheels.

Secured to the central bar D at the rear is a collar 13, within which is removably held a pipe 15, this pipe being secured by means of the set-screw 14. Below and working within this pipe 15 is an axle 16, provided with the caster-wheel E. This axle 16 is held within the pipe 15 by means of the set-screw 17, which works within a suitable groove within the axle, so that this caster-wheel E is swivelly held within the tube 15, as is usual in implements provided with three supporting-wheels. The pipe or tube 15 may be raised or lowered, and the frame members A and A' may be raised or lowered upon the axle-stems 3, so that the whole frame is vertically adjustable and may be raised and lowered.

Secured to the projecting end *b* of the central frame member D is the perforated bar *c*, provided with the openings *z*, and above is secured the plate *c'*, held by means of suitable nut-provided bolts *x'*, so that the forward bar portion *b* is clasped between the bars *c* and *c'*.

Secured to the forward portion *b* of the frame member D by means of the bolt 29, referring now to Fig. 1, is a draft-bar F, which is provided with the central perforations $x$, and to each end is further provided with openings, so that the nut-provided bolts 21 (shown in Fig. 4) may be placed within the bar at the ends. The bolts 21, passing through openings within the end of this bar F, holds two central stub-bars 22, which in turn by means of a bolt 23 are movably secured to the ends $a$ of the counterpart frame members A A'. Centrally the bar F works above the end $b$ and below the bar 32, which is secured by means of the bolts 29 and 31, as shown. By this means the draft-bar F may be adjusted sidewise to compensate the draft inequalities when the implement is run on an incline.

To the bar F are secured suitable ears H H, to which are fastened the shafts 25 25, between which the central horse works, this implement being intended to be drawn by three draft-animals.

Secured pivotally to the draft-bar F are the levers G G, held by means of the bolts 24, to the outer end of which levers are secured the singletrees 30 by means of the links 28, while at the inner ends these levers G are secured by means of the links 26 to the central singletree 27, as shown in Fig. 1.

Secured to the forward pipe or bar C by means of the bars 40', which are bifurcated so that they work above and below this tube C, are the sheaves or wheels $o$, which ride against the pipe, as shown in Figs. 1 and 4. Extending from these bars 40', there being four such bars shown in Fig. 1, are the cultivator-beams M of any desired construction, which are pivotally secured to the bars 40' by means of the bolts 51 and 52. These cultivator-beams are used in sets of twos and are united by the arch-bars N, as is usual in cultivator construction. To these cultivator-beams are secured the brackets 53 53, to which are secured the usual standards 54, provided with the shovels or cultivator-shovels $f$. These cultivator-shovels form no part of my invention, as any suitable make of manufacture may be used. These arch-bars N are secured to the cultivator-beams M by means of the U-shaped bolt $m$, so that the cultivator-beams may be spread or brought nearer together, as may be desired.

Secured to the bars 40' are the telescoping bars 40, each provided with the lip end 42, the remaining telescope-bar 41 provided with the upwardly-extending lip 42, as is shown in Fig. 2, so that these bars slide one upon the other and may be lengthened or shortened. To unite these bars, referring now to Fig. 3, I employ the bolts 45 and the bars 43 43, between which the adjustably-secured bars 40 and 41 are held. The upper bar 43 is provided with a bolt $h$, as is shown in Figs. 2 and 3, which supports a bar 39, secured to a lever K, as is shown in Fig. 1. By means of these clamping-bars 40 41 the cultivator-beams M are adjustably held at their forward ends.

Secured to each cultivator-beam M is a chain S, which chain in turn is adjustably secured by any suitable means, such as a hook, to a perforated bar P, as is shown more clearly in Fig. 5, and from this bar P extends upwardly a chain R, working over a pulley $p$, which chain R is secured to an ordinary locking-lever T of any suitable construction, as is shown in Fig. 5, so that these cultivator-beams, which slide upon the forward pipe C, may be raised and lowered to give the cultivator-shovels $f$ proper adjustment. In connection with the locking-lever T, I use the usual notched sector 56, from which extends a bar 57, supporting the pulley $p$, and a bolt $n$, holding the lever. Any suitable lever may be used.

Referring to Fig. 1, it will be noticed that secured to the perforated bar $c$ by means of the bolts 34 are the bars I I, to which are secured the levers K K, so that these levers are pivotally as well as adjustably secured to the perforated bar $c$. To the bars I I are secured the connecting-rods 39, secured to the adjustably-secured bars 40 and 41, so that these levers K, in effect, are shifting-levers, by means of which the cultivator-bars M M may be shoved from side to side. These shifting-levers may be provided below with suitable foot-rests 35, as is shown in Fig. 1, so that the operator may throw these cultivator-beams from side to side by means of his feet or they may be operated by hand. It will further be noticed that these shifting-levers are connected by means of a bar 38, working within suitable openings $y$, so that in working one lever both cultivator-frames may be independently shifted.

In detaching the connecting-bar 38 each set of cultivator-frames may be independently shifted.

To strengthen the structure, the central bar D is secured to the pipe C by means of the rods 36, held by the bolts 37, as shown in Fig. 1.

The operator can adjust his draft-animals to the cultivator in shifting the draft-bar F from side to side to adjust the track and equalize the draft and then by means of the bolts 34 can adjust the shifting-levers K. The spread of the cultivator-shovels is next adjusted by means of the adjustably-connected bars 40 and 41 and the U-shaped bolts B, while the vertical position is determined by means of the levers T.

Having thus described my said invention, what I claim as new, and desire to secure by United States Letters Patent, is—

1. The combination in an implement of the character described, of two wheel-supported axle-stems, of a four-sided frame vertically adjustably secured to said axle-stems a caster-wheel vertically adjustably secured to said frame, a draft-bar laterally adjustably secured to said frame, four cultivator-beams movably secured to said frame at the side adjacent said draft-bar, arched bars adjustably connecting said cultivator-beams in sets of twos, adjustably-secured bars secured to said cultivator-beams, two shifting-levers adjustably-supported rods connecting said shifting-levers, connecting-bars extending from said levers to said cultivator-beams to provide each set of cultivator-beams with a lateral shifting mechanism, adjustable levers secured to said frame, and chains extending from said cultivator-beams and adjustably secured to said last-mentioned levers, to provide a means to vertically adjust said sets of cultivator-beams.

2. In an implement of the character described, the combination with a skeleton frame, of a transverse bar, of cultivator-beams shiftably secured to said transverse bar, adjustably-secured bars sliding one upon the other having their ends secured to said cultivator-beams, shifting-levers pivotally secured to said frame, and a rod connecting said shifting-levers to said bars, as and for the purpose set forth.

3. The combination with a supporting-frame, of holders adjustable in a horizontal plane secured to said supporting-frame, axle-stems secured to said adjustably-secured holders and adjustable in a vertical plane, wheels secured to said axle-stems, a caster-wheel adjustably secured to said supporting-frame, so that the whole supporting-frame may be raised and lowered, a transverse bar, a plurality of cultivator-bars slidably secured to said bar shifting-levers secured to said cultivator-bars, and adjusting-levers secured to said cultivator-bars, so that said bars may be vertically adjusted, as set forth.

Signed in the presence of two witnesses.

JACOB CLAUSEN.

Witnesses:
W. W. CASADY,
ALBERT WELLS.